United States Patent
Aston et al.

(10) Patent No.: US 12,552,552 B2
(45) Date of Patent: *Feb. 17, 2026

(54) SPACECRAFT PANEL AND METHOD

(71) Applicant: The Boeing Company, Chicago, IL (US)

(72) Inventors: Richard W. Aston, Brea, CA (US); Nicole Diane Schoenborn, El Segundo, CA (US); Nicole Marie Jain, Hermosa Beach, CA (US); Christopher David Joe, Santa Clara, CA (US)

(73) Assignee: The Boeing Company, Arlington, VA (US)

( * ) Notice: Subject to any disclaimer, the term of this patent is extended or adjusted under 35 U.S.C. 154(b) by 32 days.

This patent is subject to a terminal disclaimer.

(21) Appl. No.: 18/045,830

(22) Filed: Oct. 12, 2022

(65) Prior Publication Data

US 2023/0054310 A1 Feb. 23, 2023

Related U.S. Application Data

(63) Continuation of application No. 16/554,150, filed on Aug. 28, 2019, now Pat. No. 11,794,927.

(51) Int. Cl.
*B64G 1/22* (2006.01)
*B22F 10/28* (2021.01)
(Continued)

(52) U.S. Cl.
CPC ............... *B64G 1/22* (2013.01); *B33Y 10/00* (2014.12); *B33Y 80/00* (2014.12); *B22F 10/28* (2021.01);
(Continued)

(58) Field of Classification Search
CPC ....................................................... B64G 1/22
See application file for complete search history.

(56) References Cited

U.S. PATENT DOCUMENTS

| 4,757,665 A | 7/1988 | Hardigg |
| 5,102,723 A * | 4/1992 | Pepin .................... F41H 5/0442 428/102 |

(Continued)

FOREIGN PATENT DOCUMENTS

| CA | 106694884 | 5/2017 |
| CN | 105667837 | 6/2016 |

(Continued)

OTHER PUBLICATIONS

Espacenet machine translation of CN-106694884-A retrieved on Oct. 28, 2023 (Year: 2017).*

(Continued)

*Primary Examiner* — Jophy S. Koshy
*Assistant Examiner* — Joshua S Carpenter
(74) *Attorney, Agent, or Firm* — Walters & Wasylyna LLC (57) ABSTRACT

A spacecraft panel includes a first skin, a second skin spaced apart from the first skin, and a first truss structure connecting the first skin to the second skin. The first truss structure includes a plurality of truss members, and each truss member is integral with the first skin and the second skin, such that the first skin, the second skin, and the first truss structure collectively form a single monolithic joint-free structure.

20 Claims, 7 Drawing Sheets

(51) Int. Cl.
  *B22F 10/66* (2021.01)
  *B33Y 10/00* (2015.01)
  *B33Y 80/00* (2015.01)
  *B64G 1/56* (2006.01)
  *B64G 1/58* (2006.01)
(52) U.S. Cl.
  CPC ............... *B22F 10/66* (2021.01); *B64G 1/56* (2013.01); *B64G 1/58* (2013.01)

(56) References Cited

U.S. PATENT DOCUMENTS

| | | | |
|---|---|---|---|
| 6,207,256 | B1 | 3/2001 | Tashiro |
| 9,796,486 | B1 | 10/2017 | Ilsley et al. |
| 10,538,347 | B1 | 1/2020 | Turner et al. |
| 2004/0074206 | A1 | 4/2004 | Tanase |
| 2006/0107611 | A1 | 5/2006 | Merrifield |
| 2009/0282773 | A1 | 11/2009 | Queheillalt et al. |
| 2013/0000247 | A1 | 1/2013 | Sypeck |
| 2014/0083651 | A1* | 3/2014 | Chaix ................ B64G 1/50 29/890.032 |
| 2014/0131521 | A1 | 5/2014 | Apland et al. |
| 2015/0017383 | A1 | 1/2015 | Yang |
| 2015/0175210 | A1* | 6/2015 | Raymond .............. B62D 25/02 29/897.2 |
| 2015/0298423 | A1 | 10/2015 | Holemans |
| 2016/0208476 | A1* | 7/2016 | Wadley ................. C22C 38/04 |
| 2016/0237836 | A1 | 8/2016 | Harris |
| 2016/0340061 | A1 | 11/2016 | Bose |
| 2018/0037342 | A1 | 2/2018 | Dong et al. |
| 2018/0194096 | A1 | 7/2018 | Martial Somda |
| 2018/0194494 | A1 | 7/2018 | Dube |
| 2018/0207726 | A1* | 7/2018 | Robrecht ............... B33Y 80/00 |
| 2018/0229443 | A1 | 8/2018 | Pham |
| 2018/0251238 | A1 | 9/2018 | Cherrette |
| 2018/0251241 | A1 | 9/2018 | Burt |
| 2019/0202163 | A1 | 7/2019 | Yeh et al. |
| 2019/0337220 | A1 | 11/2019 | Beyerle |
| 2021/0354856 | A1 | 11/2021 | Aston et al. |

FOREIGN PATENT DOCUMENTS

| | | | |
|---|---|---|---|
| CN | 106694884 | | 5/2017 |
| CN | 106694884 A | * | 5/2017 ............ B22F 3/1115 |
| CN | 108801737 A | | 11/2018 |
| CN | 109317677 | | 2/2019 |
| CN | 109823508 A | | 5/2019 |
| CN | 209290656 U | | 8/2019 |
| CN | 111532452 | | 8/2020 |
| EP | 3034208 | | 6/2016 |
| EP | 3034208 A1 | | 6/2016 |
| JP | 2000-128092 | | 5/2000 |
| JP | 2002-120310 | | 4/2002 |
| JP | 2010-201965 | | 9/2010 |
| JP | 2016-013667 | | 1/2016 |

OTHER PUBLICATIONS

Zhang, Xiaoyu, et al. "Vibration tests of 3D printed satellite structure made of lattice sandwich panels." AIAA Journal 56.10 (2018): 4213-4217. (Year: 2018).*
European Patent Office, Extended European Search Report regarding European Patent Application No. EP20189687, dated Feb. 1, 2021.
Morrett, "Selecting a filler metal: Seven factors to consider," Plant Engineering, Sep. 10, 2015.
Zhang et al., "Vibration Tests of 3D Printed Satellite Structure Made of Lattice Sandwich Panels," AIAA Journal, vol. 56., No. 10., Oct. 1, 2018, pp. 4213-4217.
Zhang et al: "Vibration Test of 3D Printed Satellite Structure Made of Lattice Sandwich Panel," *AIAA Journal,* vol. 56, No. 10, pp. 4213-4217 (Oct. 1, 2018).
Moore et al: "Fundamentals of Space Systems," *The John Hopkins University, Applied Physics Laboratory Series in Science and Engineering, Oxford University Press,* pp. 712-717 (1994).
Japan Patent Office, Office Action, with English translation, App. No. 2020-121996 (Apr. 1, 2024).
European Patent Office, "Communication pursuant to Article 94(3) EPC," App. No. 20 189 687.5 (May 28, 2024).
European Patent Office, Extended European Search Report, App. No. 24205220.7 (Feb. 11, 2025).
China National Intellectual Property Administration, Office Action, App. No. 202010878198.9 (Feb. 13, 2025).
China National Intellectual Property Administration, Office Action, App. No. 202010878198.9 (Jun. 21, 2025).

* cited by examiner

SPACECRAFT PANEL AND METHOD

CROSS-REFERENCE TO RELATED APPLICATIONS

The present application is a continuation of, and claims priority to, pending U.S. application Ser. No. 16/544,150 filed on Aug. 28, 2019, and entitled ADDITIVELY MANUFACTURED SPACECRAFT PANEL, the entire contents of which is expressly incorporated by reference herein.

BACKGROUND

Space presents a uniquely hostile environment for spacecraft such as satellites. Thermal management in particular is challenging, in addition to the danger of damaging radiation and orbital debris impact. Many spacecraft are constructed of composite materials such as sandwich-structure panels, which are strong and light. However, such panels typically include a core material bonded between two thin skins, which results in high thermal impedance. Composite sandwich-structure panels can also be expensive and labor intensive to manufacture. Wrapping and extraction of tooling, precise placement of individual plies, and multiple stages of curing and layup each require significant time and touch labor. For localized features such as shielding and reinforcement, separate parts are attached post-production, requiring further expense and labor.

Additive Manufacturing (AM) is quickly gaining popularity in many industries as a method of rapid production at relatively low cost. AM, sometimes known as 3D printing, can be used to create a solid object from a 3D model by building the object incrementally. AM typically applies a raw material that is then selectively joined or fused to create the desired object. The raw material is typically applied in layers, where the thickness of the individual layers can depend upon the particular techniques used.

Often the raw material is in the form of granules or powder, applied as a layer and then selectively fused by a heat source. In many cases, the upper surface of a bed of such material is fused, and the growing workpiece is then lowered slightly into the bed itself. A fresh layer of raw material is then applied to the bed, and the next layer is fused onto the previous one. The granular raw material may include for example thermoplastic polymer, metal powder, metal alloy powder, or ceramic powder, which may be fused using a computer-controlled heat source, such as a scanning laser or scanning electron beam. Exemplary methods include selective laser melting (SLM), direct metal laser sintering (DMLS), selective laser sintering (SLS), fused deposition modelling (FDM), and electron beam melting (EBM), among others.

Conventional part designs used for subtractive manufacturing or composite laminate construction may be inefficient or even unworkable for AM. Depending on the process and material used, unsupported features may collapse, delicate features may be rendered with insufficient clarity, and/or warping and cracking may occur. New designs maintaining functionality of conventional parts while enabling efficient use of AM methods are needed.

SUMMARY

The present disclosure provides systems, apparatuses, and methods relating to additively manufactured spacecraft panels. In some examples, a method of additively manufacturing a spacecraft panel may include printing a first skin and a second skin spaced from the first skin. The method may further include printing a first truss structure connecting the first skin to the second skin.

In some examples, a spacecraft panel may include a first skin and a second skin spaced apart from the first skin. The panel may further include a first truss structure connecting the first skin to the second skin. The first skin, second skin, and first truss structure may form a single additively manufactured unit.

In some examples, a spacecraft may include a body. The body may include a plurality of additively manufactured panels. Each panel may include a first skin, a second skin, and a truss structure. The second skin may be spaced from the first skin, and the truss structure may connect the first skin to the second skin. The first skin, second skin, and truss structure may form a single additively manufactured unit.

Features, functions, and advantages may be achieved independently in various examples of the present disclosure, or may be combined in yet other examples, further details of which can be seen with reference to the following description and drawings.

DETAILED DESCRIPTION

Various aspects and examples of an additively manufactured spacecraft panel having a truss structure, as well as related methods, are described below and illustrated in the associated drawings. Unless otherwise specified, an additively manufactured spacecraft panel in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through E, each of which is labeled accordingly.

Overview

In general, an additively manufactured spacecraft panel in accordance with the present teachings may include two skins connected by a truss structure. The panel may be a single additively manufactured unit. The panel may also be described as a sandwich structure or sandwich-structured composite material, having two face sheets connected by a core.

Figure 1:
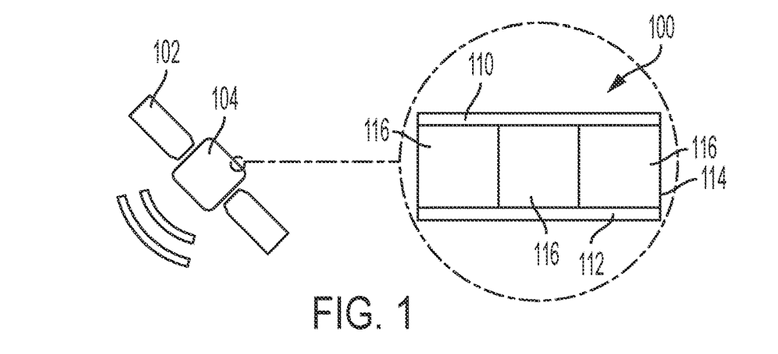
FIG. 1 is a schematic diagram of an illustrative spacecraft including an additively manufactured truss panel in accordance with aspects of the present disclosure.

FIG. 1 is a schematic diagram of an illustrative spacecraft 102. In the present example, spacecraft 102 is depicted as a communications satellite. In some examples, the spacecraft may be an astronomical space observatory, a launch vehicle, an orbital space station, and/or any space-going craft. The spacecraft has a body or primary structure 104, which includes one or more additively manufactured truss panels, including a panel 100. Such truss panels may be used for interior or exterior structures of spacecraft 102, and/or may be used for secondary structures, detachable modules, equipment housings, and/or any appropriate structure of the spacecraft. The one or more additively manufactured truss panels may include features configured for challenges of the space environment.

Panel 100 includes a first skin 110, a second skin 112, and a truss structure 114. First skin 110 is spaced from second skin 112, and the two skins are parallel. In FIG. 1, panel 100 is depicted end-on, but in the present example, each of the panel and the skins may be understood to have a planar extent. In some examples, the first and second skins may have curvature and/or more complex geometry. Truss structure 114 is connected to first skin 110 and to second skin 112. The first and second skins are in turn connected by the truss structure.

Truss structure 114 includes an array of core structures 116. Each core structure may include a framework of truss members having any appropriate geometry. The geometry of the core structures may be uniform over panel 100 or may vary according to location in the panel. For example, core structures 116 may vary according to expected non-uniform loading of panel 100 and/or the core structures may vary according to a curvature of skins 110, 112. The core structures may be arranged in a grid, a repeating pattern, and/or in any effective manner.

Panel 100 may be additively manufactured, or printed, as a single unitary structure. The panel may also be described as monolithic. In other words, skins 110, 112 and truss structure 114 may be printed together and the panel may be formed of printed material without joints or seams. Panel 100 may have a build axis. As the panel is printed, layers of material may be deposited in a plane perpendicular to the build axis. In some examples, the build axis may be parallel to the planar extent of skins 110, 112. In such examples, the panel may also be described as being printed with skins 110, 112 in a vertical orientation. Consequently, in such examples, skins 110, 112 and truss structure 114 may all be printed concurrently rather than sequentially.

The truss members of each core structure 116 may be oriented and/or shaped relative to the build axis such that the truss members are self-supporting during printing. That is, each core structure 116 may be printed without need for secondary supports or removal of supporting material subsequent to printing. For example, truss members may extend at an angle of no more than forty-five degrees relative to the build axis. In some examples, panel 100 may include additional structures and/or features. In such examples, each structure and/or feature may be oriented, shaped, and/or configured to be self-supporting during printing. Panel 100 may be configured for manufacture without post-processing such as machining subsequent to printing.

Panel 100 may be customized according to intended use, structural function, and/or placement within a spacecraft. Additive manufacture may allow flexibility in design of the panel, and incorporation of localized features. For example, panel 100 may include localized thickening for structural reinforcement, thermal spreading, or heat dissipation. For another example, panel 100 may include integrated conductors and/or attachment features such as fastener engaging structures. For another example, truss structure 114 may be configured to improve resistance to an expected primary loading mode or may be inhomogeneous to match expected load inhomogeneity. Design flexibility and localized features may be especially important for spacecraft panels, and challenges of the space environment such as radiation, micrometeoroid and orbital debris (MMOD) impact, and thermal conditions.

Examples, Components, and Alternatives

The following sections describe selected aspects of exemplary additively manufactured spacecraft panels as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Pyramidal Truss Spacecraft Panel

As shown in FIGS. 2-5, this section describes an illustrative pyramidal truss spacecraft panel 200. Truss panel 200 is an example of an additively manufactured truss panel, as described above. Truss panel 200 includes a first skin 210 and a second skin 212. The first and second skins are connected by a truss structure 214. As described further below, each of the skins and the truss structure may be shaped, featured, and/or configured according to desired properties of truss panel 200. Truss panel 200 may be configured for use in any spacecraft. The truss panel may function as a structural component, as part of a thermal management system, as radiation shielding, and/or as micrometeoroid and orbital debris (MMOD) shielding, for example.

Figure 2:
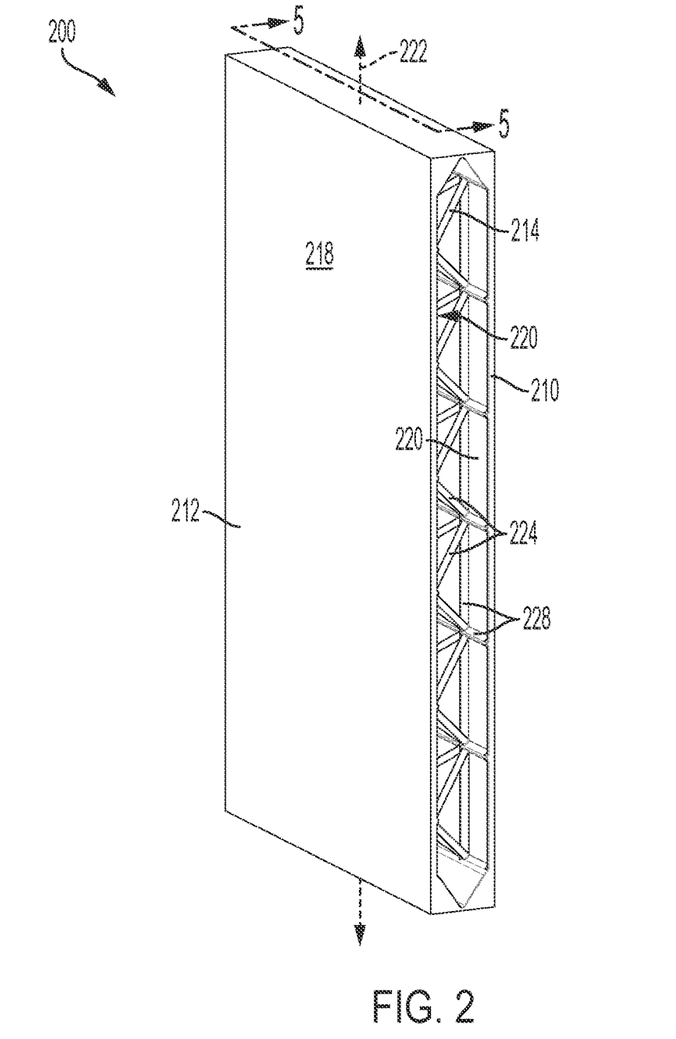
FIG. 2 is an isometric view of another illustrative additively manufactured spacecraft panel.

Truss panel 200 may comprise any material or materials appropriate to additive manufacture. In the present example, the panel comprises a laser sintered metal alloy and is manufactured by direct laser metal sintering. An aluminum alloy may offer an advantageous strength-to-weight ratio and provide effective heat radiation and/or rejection. Manufacture of skins 210, 212 and truss 214 as a unitary metal structure may improve thermal performance and heat rejection of the panel by removing impedance caused by adhesive materials in traditionally manufactured sandwich panels. Such thermal properties may be especially advantageous for thermal management in a space environment.

In the present example, truss panel 200 is approximately half an inch thick and 3.5 inches wide by 6 inches long. Panel dimensions may be constrained by a capacity of the apparatus used in manufacture of the panel. To form a panel having desired dimensions beyond the capacity of a selected additive manufacturing apparatus, a plurality of panels such as truss panel 200 may be printed separately and joined together. For example, truss panel 200 may be welded, bonded, and/or fastened to another panel as described herein.

As shown in FIG. 2, each of skins 210, 212 is planar and rectangular. Each skin has an outer surface 218 and a parallel inner surface 220. First skin 210 is parallel to second skin 212. In the present example, each skin has a uniform thickness throughout, and the two skins are identical. Each skin has a thickness of approximately 0.02 inches. In some examples, as discussed further in section C below, one or both skins may vary in thickness and/or one skin may have a greater thickness than the other.

Panel 200 has a primary axis 222, which extends parallel to skins 210, 212. In the present example, primary axis 222 is parallel to a longer side of the rectangular shape of the skins. Panel 200 is additively manufactured according to primary axis 222, which may also be described as a build axis or a vertical axis. In other words, the panel may be printed such that primary axis 222 is aligned with a build direction of an additive manufacturing apparatus. For example, panel 200 may be printed onto a build plate by depositing layers of material parallel to the build plate. In such an example, panel 200 may be printed with primary axis 222 perpendicular to the build plate.

Because primary axis 222 is parallel to skins 210, 212, the skins may be described as being printed vertically. Each of outer surface 218 and inner surface 220 of first skin 210 and second skin 212 may extend in the build direction throughout printing. Such orientation may allow the skins to be printed without secondary supports, with a good surface finish, and with limited warping. Such orientation may also reduce a footprint size of panel 200. Additive manufacturing equipment, or 3D printers, typically have a limited print area. For instance, a printer may have a limited build plate surface area. Orienting panel 200 vertically during printing may improve efficiency by allowing multiple panels to be printed simultaneously, in a single deposition run.

Figure 3:
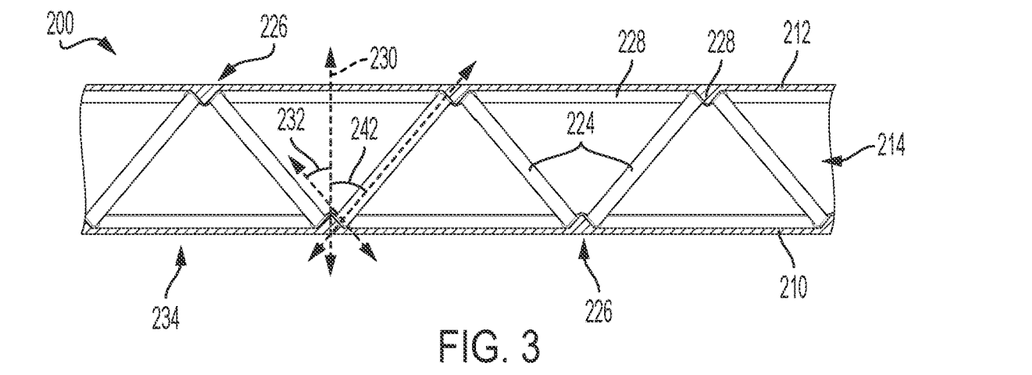
FIG. 3 is an elevation view of a portion of the panel of FIG. 2.
Figure 4:
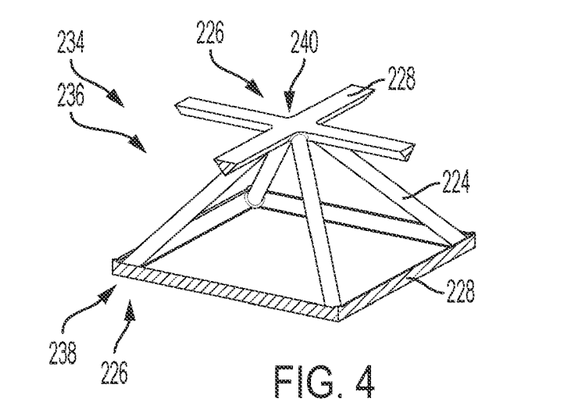
FIG. 4 is an isometric view of a core structure of the panel of FIG. 2.
Figure 5:
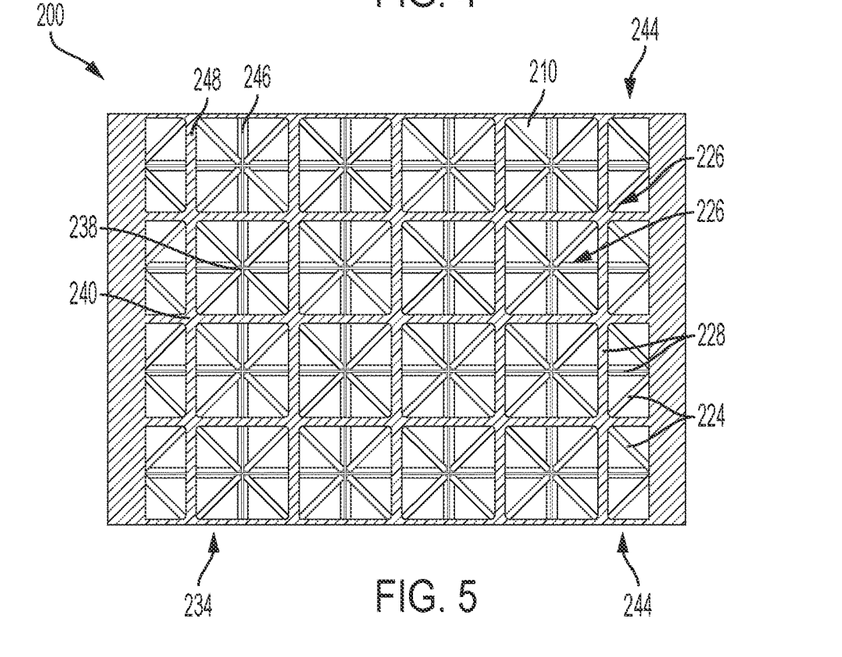
FIG. 5 is a cross-sectional view of the panel of FIG. 2, along lines 5-5.

Truss structure 214 of panel 200 is depicted in more detail in FIGS. 3-5. The truss structure includes a plurality of truss members 224 extending between nodes 226. As shown in FIG. 3, each truss member extends between a node on inner surface 220 of first skin 210 and a node on the inner surface of second skin 212. Each truss member 224 may be approximately cylindrical in shape.

In the present example, truss structure 214 further includes a plurality of triangular stiffeners 228. Each stiffener is disposed on inner surface 220 of first skin 210 or second skin 212. In the present example, each stiffener has a maximum thickness of approximately 0.04 inches, or twice the thickness of skins 210, 212. The maximum thickness of stiffeners 228 is also approximately equal to a diameter of truss members 224. Stiffeners 228 and truss members 224 may have any desired thickness or diameter. Dimensions of the stiffeners and/or truss members may be selected according to desired structural properties of panel 200.

Each node 226 is located at a stiffener. Stiffeners 228 may improve structural properties of skins 210, 212 such as stiffness and buckling stability, and may strengthen connection between truss members 224 and the skins. Including the stiffeners may allow the thickness of the skins to be reduced without sacrificing desired structural properties. Reducing thickness of the skins or other portions of the panel may reduce overall weight, material cost and print time of panel 200. The triangular cross-sectional shape of the stiffeners may provide effective reinforcement of skins 210, 212 with limited material. The stiffeners may also improve the printability of thin skins. In other words, the stiffeners may reduce or prevent adverse results, such as warping or cracking, which may occur when additively manufacturing thin or delicate structures.

Stiffeners 228 are configured to be self-supporting during printing of panel 200. More specifically, the triangular cross-sectional shape of the stiffeners is shaped and oriented to allow self-support. In addition to primary axis 222, panel 200 has a secondary axis 230. Primary axis 222 may also be described as a vertical axis and secondary axis 230 may also be described as a horizontal axis. Secondary axis 230 is perpendicular to primary axis 222 and to skins 210, 212. As shown in FIG. 3, each side of the triangular cross-sectional shape of stiffeners 228 extends at a stiffener angle 232 relative to secondary axis 230. Angle 232 may be at least 35 degrees. In the depicted example, angle 232 is approximately 40 degrees.

In the present example, stiffeners 228 have an isosceles triangle shape and angle 232 is matching on each side. In some examples, the stiffeners may have a scalene triangle or other shape. In such examples, a downward-facing surface of the stiffener relative to the build orientation of panel 200 may form an angle of at least 35 degrees relative to secondary axis 230.

Truss structure 214 includes a plurality of core pyramid frameworks 234, which are arranged in a grid or array. FIG. 4 shows a first core pyramid 236. Core pyramid 236 includes four truss members 224. Each truss member extends from a separate base node 238 to a single common upper node 240. Base nodes 238 are disposed at the corners of a square shape formed by four sections of stiffeners 228. Additional sections of stiffeners extend from upper node 240.

As shown in FIG. 3, first core pyramid 236 is depicted as oriented with base nodes 238 on first skin 210 and upper node 240 on second skin 212. Each core pyramid 234 may be described as having a base at the first skin and a vertex at the second skin. Alternatively, truss members 224 of truss structure 214 may be viewed as belonging to an array of core pyramids each having a base at the second skin and a vertex at the first skin. Panel 200 may accordingly have a symmetrical response to loading.

Each core pyramid 234 is configured to be self-supporting during printing. More specifically, truss members 224 of the core pyramid each extend at angles selected to allow self-support. A first truss angle 242 between a truss member 224 and secondary axis 230 is shown. First truss angle 242 lies in the plane defined by the primary and secondary axes of panel 200. A second truss angle, not shown, is also defined between truss member 224 and secondary axis 230 in the plane perpendicular to the primary axis but including the secondary axis.

Each truss angle may be at least 35 degrees and no more than 50 degrees. An angle of 35 degrees or more may allow the truss member to be printed without secondary supports. On the other hand, an angle of no more than 50 degrees may ensure that the truss formed by the truss members is sufficiently strong. In the present example, core pyramid 236 has a square base, and as a result the first and second truss angles are equal. In the present example, the truss angles are each 40 degrees.

Each core pyramid 234 may also be configured according to desired structural properties of panel 200. For example, the first and/or second truss angle may be increased or decreased to tune the panel to a desired stiffness. For another example, a diameter of each truss member 224 may be increased to improve panel strength or decreased to reduce overall panel weight.

FIG. 5 is a cross-sectional view of panel 200, showing the tessellated pattern of core pyramids 234 and off-set grid patterns of stiffeners 228. First skin 210 is covered by the array of core pyramids without gaps or overlaps, with the base of each core pyramid meeting the bases of adjacent core pyramids along stiffeners 228 of first skin 210. Each core pyramid 234 shares base nodes 238 with adjacent core pyramids. At side edges 244, core pyramids 234 are truncated and each include only two truss members 224.

The plurality of stiffeners 228 on first skin 210 form a first square grid 246. The plurality of stiffeners 228 on second skin 212 (see FIG. 3) form a second square grid 248. Each square grid comprises a first plurality of parallel stiffeners and a second plurality of parallel stiffeners which intersect the first plurality and are orthogonal to the first plurality. The first and second square grids 246, 248 are offset from each other, such that the intersections of first square grid 246 are vertically aligned with a center of the grid squares of second square grid 248. Intersections of first square grid 246 coincide with base nodes 238, and intersections of second square grid 248 coincide with upper nodes 240 of core pyramids 234.

B. Illustrative Cross Truss Spacecraft Panel

Figure 6:
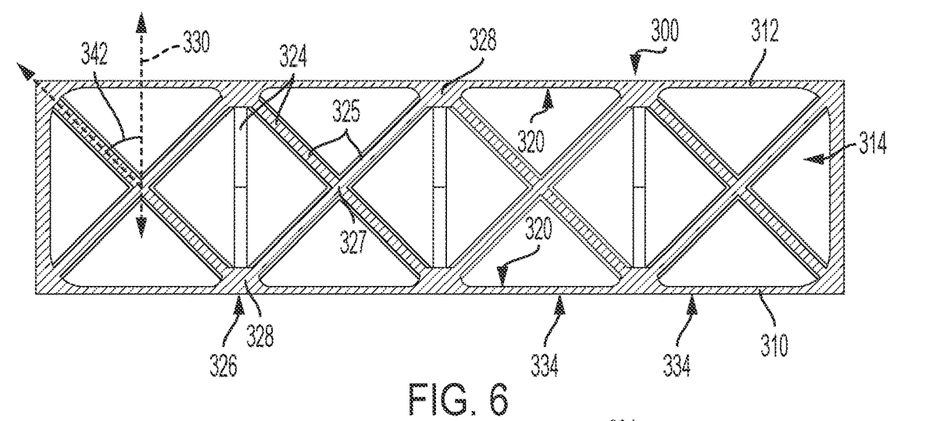
FIG. 6 is an elevation view of another illustrative additively manufactured spacecraft panel.
Figure 7:
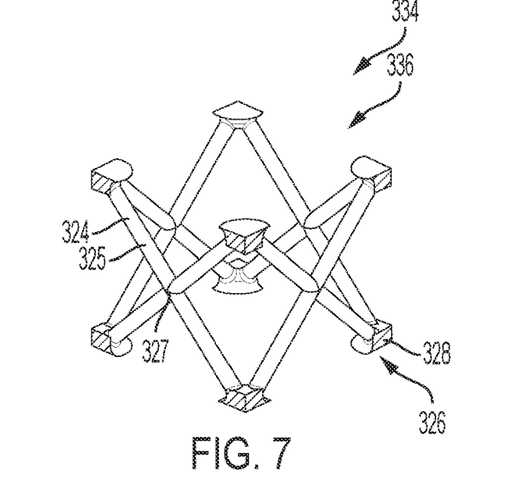
FIG. 7 is an isometric view of a core structure of the panel of FIG. 6.

As shown in FIGS. 6 and 7, this section describes an illustrative cross truss spacecraft panel 300. Truss panel 300 is an example of an additively manufactured truss panel, as described above. Truss panel 300 includes a first skin 310 and a second skin 312. The first and second skins are connected by a truss structure 314. Truss structure 314 may be configured to improve a selected strength value of panel 300, such as resistance to shearing, tension, or buckling. In the present example, truss structure 314 is configured for resistance to buckling loads.

Each of skins 310, 312 is planar and rectangular, with an inner surface 320. First skin 310 is parallel to second skin 312. Truss structure 314 includes a plurality of cross or X-shaped truss members 324 extending between nodes 326. As shown in FIG. 6, each truss member extends between a pair of nodes on inner surface 320 of first skin 310 and a pair of nodes on the inner surface of second skin 312. Each truss member 324 includes four legs 325, each approximately cylindrical in shape. Each leg 325 extends from a node 326 to a central join region 327 of the truss member.

In the present example, truss structure 314 further includes a plurality of circular bosses 328. Each boss extends perpendicularly from inner surface 320 of either first skin 310 or second skin 312. The circumferential edge of each boss is filleted to improve printability and self-support of the bosses. A boss is located at each of nodes 326. The bosses may facilitate and strengthen connection between truss members 324 and the skins 310, 312.

Truss structure 314 includes a plurality of core box frameworks 334, which are arranged in a grid or array. FIG. 7 shows a first core box 336. Core box 336 includes four truss members 324 arranged in a square box shape, with each truss member forming one side of the box. Nodes 326 define corners of the box shape. One leg 325 of each of two truss members 324 meets at each node.

Core boxes 334 may be described as overlapping in truss structure 314. That is, core box 336 may be described as sharing each one of the four truss members 324 with a respective one of four adjacent core boxes. Truss structure 314 may also be described as including a plurality of crisscrossed cylindrical truss members. Each of such cylindrical truss members may be described as extending diagonally between a node 326 on first skin 310 and a node on second skin 312.

Each core box 334 is configured to be self-supporting during printing. More specifically, legs 325 of the core box each extend at angles selected to allow self-support. As shown in FIG. 6, each leg 325 defines a truss angle 342 with a secondary axis 330 of panel 300. Secondary axis 330 may be perpendicular to a build direction of panel 300, and may be described as a horizontal axis. Each truss angle may be at least 35 degrees. In the present example, the sides of core box 334 are square, and the truss angles of legs 325 of each truss member 324 are equal. In some examples, truss members 324 may form rectangular sides of core box 334, and the truss angle may differ between legs. In the present example, truss angle 342 of each leg 325 is each 45 degrees.

C. Illustrative Truss Panel Features

As shown in FIGS. 8-17, this section describes multiple examples of potential features of an illustrative truss panel 400. Truss panel 400 is an example of an additively manufactured truss panel, as described above.

Figure 8:
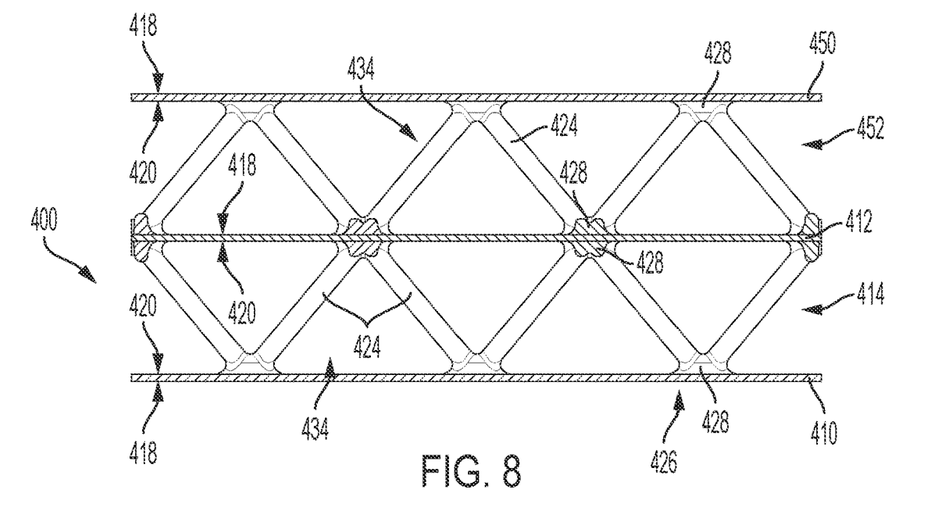
FIG. 8 is an elevation view of another illustrative additive manufactured spacecraft panel, with an additional skin and truss structure.

Truss panel 400 includes a first skin 410 and a second skin 412. The first and second skins are connected by a first truss structure 414. Each of skins 410, 412 is planar and rectangular, with an outer surface 418 and an inner surface 420. First skin 410 is parallel to second skin 412.

Truss structure 414 includes a plurality of truss members 424 extending between nodes 426. Each truss member 424 extends between a node on inner surface 420 of first skin 410 and a node on the inner surface of second skin 412. Each truss member 424 may be approximately cylindrical in shape. Truss structure 414 includes a plurality of core pyramid frameworks 434 which are each formed of four truss members 424, and which are arranged in a grid, array, and/or tessellation.

In the present example, truss structure 414 further includes a plurality of circular bosses 428. Each boss extends perpendicularly from inner surface 420 of either first skin 410 or second skin 412. The circumferential edge of each boss is filleted to improve printability and self-support of the bosses. A boss is located at each of nodes 426. The bosses may facilitate and strengthen connection between truss members 424 and the skins 410, 412.

FIG. 8 shows panel 400 customized for additional strength and stiffness by the addition of a third skin 450 and a second truss structure 452. Third skin 450 is planar and rectangular, and parallel to but spaced from second skin 412. The third skin has an outer surface 418 and a parallel inner surface 420. In the present example, third skin 450 has a uniform thickness throughout, and the first, second, and third skins are identical. Each skin has a thickness of approximately 0.02 inches.

Third skin 450 is connected to second skin 412 by second truss structure 452. Second skin 412 is sandwiched between second truss structure 452 and first truss structure 414. Outer surface 418 of first skin 410 and of third skin 450 form outer surfaces of truss panel 400.

In the present example, second truss structure 452 is substantially identical to first truss structure 414, and also includes a plurality of truss members 424 extending between nodes 426. Each truss member 424 extends between a node on outer surface 418 of second skin 412 and a node on inner surface 420 of third skin 450. Second truss structure 452 includes a plurality of core pyramid frameworks 434 which are each formed of four truss members 424, and which are arranged in a grid, array, and/or tessellation.

In the present example, nodes 426 on outer surface 418 of second skin 412 are aligned with nodes 426 on inner surface 420 of the second skin. The core pyramid frameworks 434 of first truss structure 414 are aligned with the core pyramid frameworks of second truss structure 452. The relative alignment of the core frameworks of the first and second truss structures may be selected to provide a desired structural reinforcement or other structural interaction between the trusses.

In some examples, third skin 450 may differ from second skin 412 and/or first skin 410. In some examples, second truss structure 452 may differ from first truss structure 414. Third skin 450 may have any desirable thickness and/or curvature, and second truss structure 452 may have any desired geometry. For instance, second truss structure 452 may include a plurality of core box frameworks, as described in Example B. In some examples, panel 400 may further include additional skins and truss structures Inclusion of third skin 450 and second truss structure 452 in panel 400 may increase the moment of inertia of the panel, while maintaining buckling stability. Such modification may be particularly desirable for micrometeoroid and orbital debris (MMOD) or other impact shielding. Such modification may also be used to increase a thickness of panel 400 without reducing desired structural properties such as buckling stability.

Figure 9:
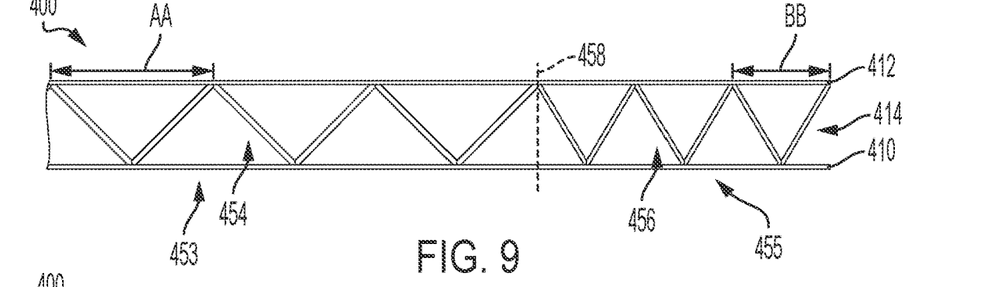
FIG. 9 is an elevation view of the panel of FIG. 8, with a variation in core density.

FIG. 9 shows panel 400 tuned for localized stiffness with a variable core density. In the depicted example, panel 400 includes a first region 453 and a second region 455. Each region includes a portion of first skin 410, second skin 412, and truss structure 414. In first region 453, truss structure 414 has a first core configuration 454 and in second region 455, truss structure 414 has a second core configuration 456. First region 453 and second region 455 meet at an interface 458 between the first and second core configurations.

In first core configuration 454, core pyramids 434 have a first density. In second core configuration 456, core pyramids 434 have a second, higher density. In other words, each core pyramid 434 of truss structure 414 has a base span dimension. In the first region, the core pyramids have a first base span dimension AA and in the second region, the core pyramids have a second base span dimension BB. The first base span dimension is greater than the second base span dimension.

In the present example, core pyramids 434 each have a square base. Accordingly, within each region 453, 455 the core density may be understood to be equal in each direction parallel to the plane of skins 410, 412. In some examples, truss structure 414 may include core pyramids having a rectangular base and/or core structures of other geometries. In such examples, the base span dimension and therefore the density of the core structures may differ according to direction.

In the present example, interface 458 may be understood to extend linearly across panel 400. Each of regions 453, 455 may constitute a rectangular section of panel 400. In some examples, the regions may have a non-linear interface and/or any desired shape. For instance, first region 453 may have a roughly circular shape and may be surrounded by second region 455. Interface 458 may lie along boundaries between individual core structures, such that no core structure is divided by the interface.

The greater density of second region 455 relative to first region 453 may provide additional stiffness. However, the increased stiffness may have a tradeoff of increased weight and material cost. Varying density over panel 400 may allow stiffness of the panel to be locally tuned. For example, density of the truss core structures may be increased in regions expected to experience stronger or more frequent loading, while density may be decreased in regions expected to experience limited loading.

Figure 10:
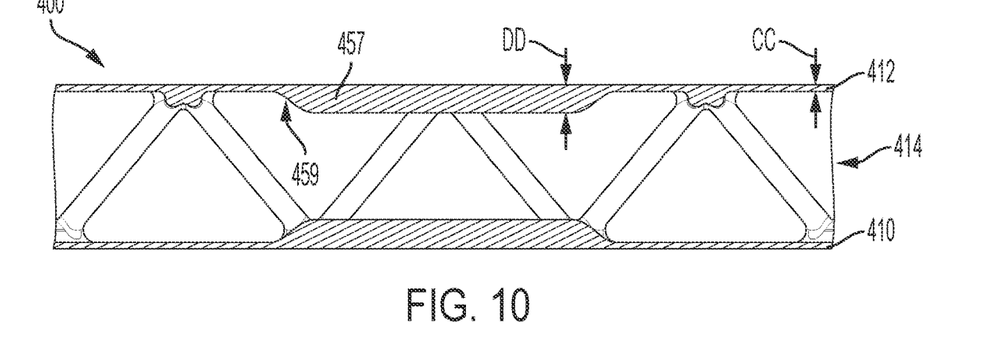
FIG. 10 is an elevation view of the panel of FIG. 8, with a localized thickening of the skins.

FIG. 10 shows panel 400 with a local thickening of skins 410, 412. In the depicted example, panel 400 includes a reinforced region 457. The region is shown including corresponding thickening of both first skin 410 and second skin 412. In some examples, the reinforced region may include thickening of only one of the skins, or the skins may be thickened to a different degree.

Outside of reinforced region 457, second skin 412 has a thickness CC. Inside the reinforced region, second skin 412 has an increased thickness DD. The increased thickness extends inward relative to the skin, such that outer surface 418 of second skin 412 remains planar throughout. At the outer boundary of reinforced region 457, the skin includes a fillet 459 to provide a gradual transition between the two thicknesses. Fillet 459 may be configured to allow reinforced region 457 to be printed without secondary supports. Reinforced region 457 further includes matching thickening of first skin 410.

In the present example, reinforced region 457 may be understood to be approximately square in shape. In some example, the region may have a non-linear boundary and any desired shape. For instance, the reinforced region may be rectangular, circular, and/or shaped to conform a structure adjacent the panel subsequent to assembly of the panel into a structure.

Reinforced region 457 may replace shielding typically comprising a separate sheet of metal or other material attached to a sandwich panel. The region may be configured for radiation shielding of electronics, for example. In such examples, reinforced region 457 may be shaped to match the shielded electronics. Reinforced region 457 be additionally or alternatively configured for thermal management purposes. For example, reinforced region 457 may extend from a thermal output zone of electronic equipment into surrounding portions of the panel to facilitate spreading and rejection of heat generated by the equipment.

Reinforced region 457 may be additionally or alternatively configured for structural reinforcement of panel 400. For example, the region may be a thin strip adjacent an edge of the panel intended for welding to another panel. The reinforced region may compensate for loss of strength in the heat affected zone of the weld join. For another example, the reinforced region may extend over a substantial area of second skin 412 to act as an integrated doubler. Such doubling may provide increased panel strength.

Figure 11:
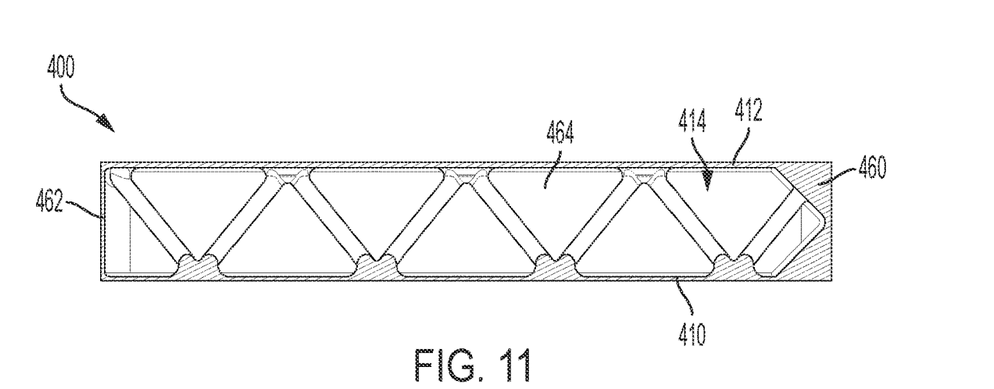
FIG. 11 is an elevation view of the panel of FIG. 8, with closeout structures.
Figure 12:
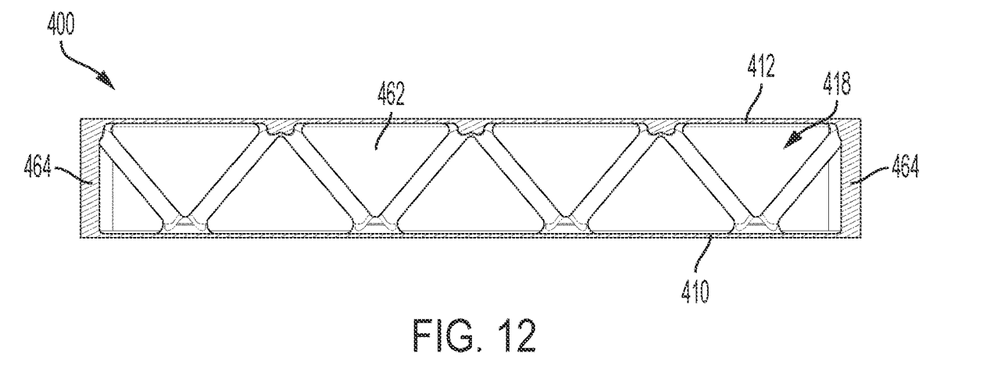
FIG. 12 is an elevation view of the panel of FIG. 11, from an orthogonal direction.

FIGS. 11 and 12 show panel 400 with integrated closeout walls. The integrated closeout walls may replace separate closeouts typically fastened to a sandwich panel. In the depicted example, panel 400 includes a closeout on each of four edges. Relative to a build orientation, or build axis, panel 400 may be described as including an upper closeout wall 460, a lower closeout wall 462, and two side closeout walls 464.

FIG. 11 is a cross-sectional view of panel 400, sectioned along a plane parallel to the build axis and showing the cross-sectional shape of the upper and lower closeout walls. Lower closeout wall 462 may comprise the first printed layers of panel 400 and may be deposited directly onto the support of a build plate. Accordingly, lower closeout wall 462 is planar and perpendicular to the build axis and skins 410, 412. In contrast, upper closeout wall 460 may comprise the final printed layers of panel 400. Therefore, in order to be printed without secondary supports, the upper closeout wall has an arched, chamfered, or upside-down V shape.

FIG. 12 is a cross-sectional view of panel 400, sectioned along a plane perpendicular to the build axis and showing the cross-sectional shape of the side closeout walls. Each side closeout wall 464 may extend parallel to the build axis of the panel. Accordingly, the side closeout walls are primarily planar. The side closeout walls include a small chamfer or fillet at each corner, where the side closeout walls connect to lower closeout wall 462 and upper closeout wall 460.

In the present example, each closeout wall extends a full length of the corresponding edge of panel 400. In some examples, a closeout wall may extend only a portion of the length of the panel and/or may include breaks, openings, or apertures. In some examples, panel 400 may include only one, two, or three of the closeout walls. Panel 400 may be designed, configured, and or utilized such that additional localized stiffness and/or strength resulting from the closeout walls can be leveraged. For example, panel 400 may be installed into a structure with upper closeout wall 460 proximate a region of greatest expected loading, to take advantage of the stiffness resulting from the additional material included in the upper closeout wall.

Figure 13:
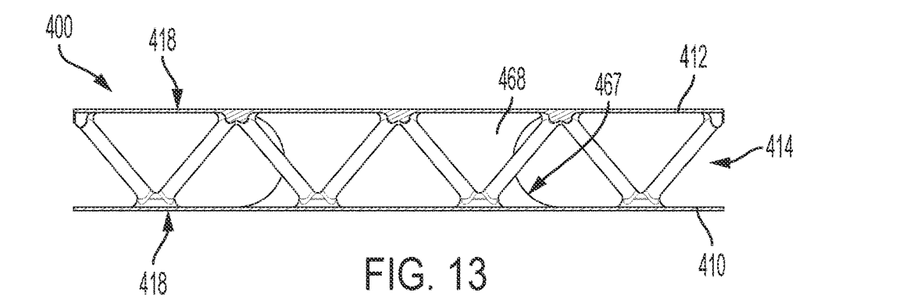
FIG. 13 is an elevation view of the panel of FIG. 8, with an integrated access hole.
Figure 14:
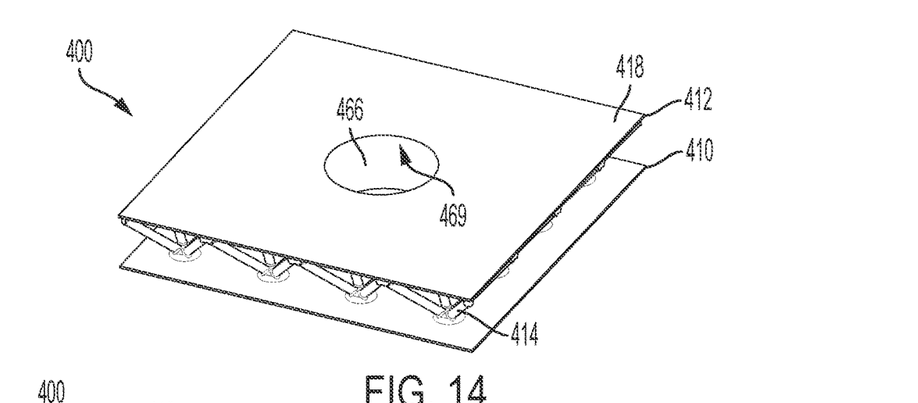
FIG. 14 is an isometric view of the panel of FIG. 13.

FIGS. 13 and 14 show panel 400 with an integrated access hole 466. Access hole 466 extends from outer side 418 of first skin 410 through the panel to the outer side of second skin 412. The access hole is circular and defined by a generally cylindrical wall 468. Wall 468 connects first skin 410 to second skin 412, similarly to truss structure 414. Wall 468 is disposed between the skins, in a region of panel 400 which does not include the truss structure. That is, wall 468 extends through a gap in truss structure 414.

Wall 468 includes an outer side 467 and an inner side 469. Inner side 469 is cylindrical and defines access hole 466. Outer side 467 is filleted, having a greatest diameter proximate each of skins 410, 412 and a smallest diameter at a point intermediate the two skins. The filleted shape of the outer side may help to support wall 468 during printing, allowing printing without secondary supports and maintaining the circularity of access hole 466. The filleted shape of outer side 467 may also provide a strong connection between wall 468 and skins 410, 412 and improve stiffness and/or strength of panel 400 proximate access hole 466.

In the depicted example, access hole 466 is circular. In some examples, access hole 466 may have a diamond shape, or may be shaped according to an intended use. As in the depicted example, the inner and outer sides of the access hole may differ, and may be configured to allow printing without secondary support and within a desired limit for surface roughness Panel 400 may include any appropriate number of access holes, positioned according to a need for access. For example, access hole 466 may be used to pass cables, pipes, wiring harnesses, and other attachments through panel 400. For another example, access hole 466 may be used for visual inspection or manual maintenance of an interior of a structure which includes the panel. Integration of access hole 466 into the printed design of panel 400 may replace the typical drilling of access holes in completed sandwich panels.

Figure 15:
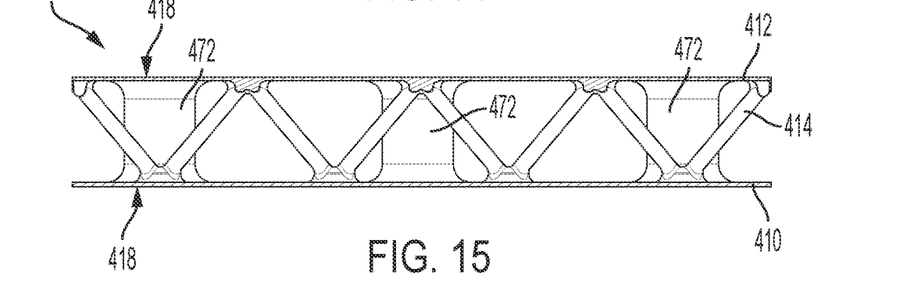
FIG. 15 is an elevation view of the panel of FIG. 8, with multiple integrated mounting holes.
Figure 16:
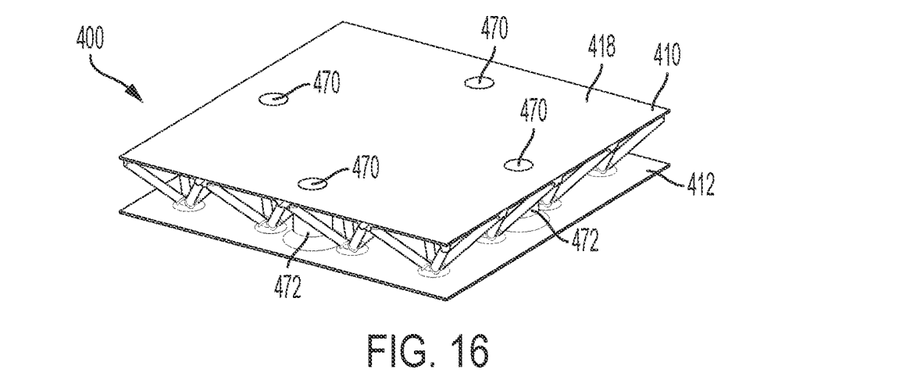
FIG. 16 is an isometric view of the panel of FIG. 15.

FIGS. 15 and 16 show panel 400 with a plurality of integrated mounting apertures 470. The apertures may be configured to facilitate assembly of multiple panels, mounting of modules or accessories to the panel, mounting of modules or accessories to structural members on an opposite side of the panel, and/or any desired mounting, fastening, and/or attachment.

Each mounting aperture 470 extends from outer side 418 of first skin 410 through the panel to the outer side of second skin 412. The mounting apertures are circular, and each defined by a cylindrical wall 472. Each wall 472 connects first skin 410 to second skin 412, similarly to truss structure 414. Walls 472 are disposed between the skins, each in a region of panel 400 which does not include the truss structure. That is, each wall 472 extends through a gap in truss structure 414.

Each wall 472 includes an outer side 467 and an inner side 469. Inner side 469 is cylindrical and defines the corresponding mounting aperture 470. Outer side 467 includes a fillet proximate each of skins 410, 412 to provide a strong connection between wall 472 and skins 410, 412 and improve stiffness and/or strength of panel 400 proximate access mounting aperture 470. Each wall 472 may be configured for printing without secondary supports. In some examples, inner side 469 and/or outer side 467 may have a diamond-shaped cross-section, or other desired shape.

Panel 400 may include any appropriate number of mounting apertures, sized and positioned according to the intended mounting. In the present example, panel 400 includes four mounting apertures positioned to allow fastening of a square module onto the panel. Each mounting aperture is sized to receive a bolt to be used in the mounting. In some examples, the mounting apertures may be sized to receive threaded bushings in order to allow threaded engagement with panel 400.

Figure 17:
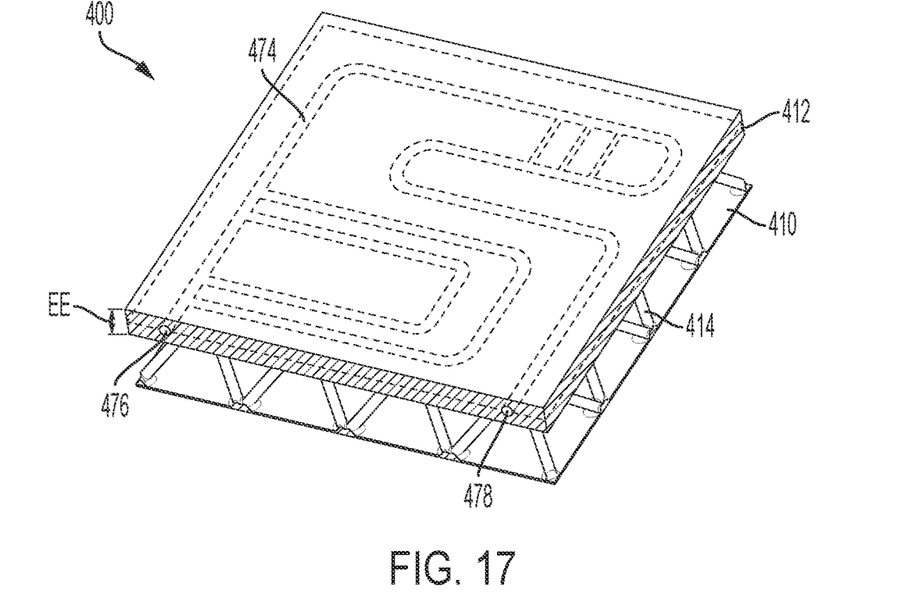
FIG. 17 is an isometric view of the panel of FIG. 8, with an internal channel embedded in the first skin.

FIG. 17 shows panel 400 with an integrated internal channel 474. In the depicted example, second skin 412 of the panel has an increased thickness EE to allow integration of channel 474. In the present example, thickness EE is approximately one quarter inch, and channel 474 has a diameter of approximately 0.02 inches. The channel may be described as embedded in second skin and/or as embedded between second skin 412 and first skin 410. Channel 474 is shown as circular in cross section, but may have any cross sectional shape allowing printing without secondary supports, including a diamond shape.

Channel 474 extends from a first aperture 476, through skin 412, to a second aperture 478. The channel is shown in FIG. 17 with an illustrative pattern including multiple turns and branching paths. In some examples, channel 474 may include a single continuous path, dead-ended portions, variations in channel size and/or in proximity to outer side 418 or inner side 420 of second skin 412, and/or any desired features. In the depicted example, apertures 476, 478 are disposed in an edge portion of second skin 412. In some examples, one or both apertures may be disposed in outer surface 418, inner surface 420, and/or different edges of the second skin. In some examples, panel 400 and/or second skin 412 may further include additional structures and/or features configured to allow connection of a fluid management system.

Channel 474 may be configured according to the intended function of the channel. For example, the channel may be configured to facilitate active cooling of equipment installed adjacent to panel 400. In such an example, channel 474 may be configured to allow smooth flow of a selected coolant fluid, and to provide substantially exposure of the fluid to a region of the panel adjacent the equipment through inclusion of multiple switchbacks and/or parallel branches. For another example, the channel may be configured to allow transportation of a fuel or lubricant through panel 400. In such an example, channel 474 may be configured to allow rapid flow of the fluid with a simple and direct path through the panel.

D. Illustrative Method of Additive Manufacture

Figure 18:
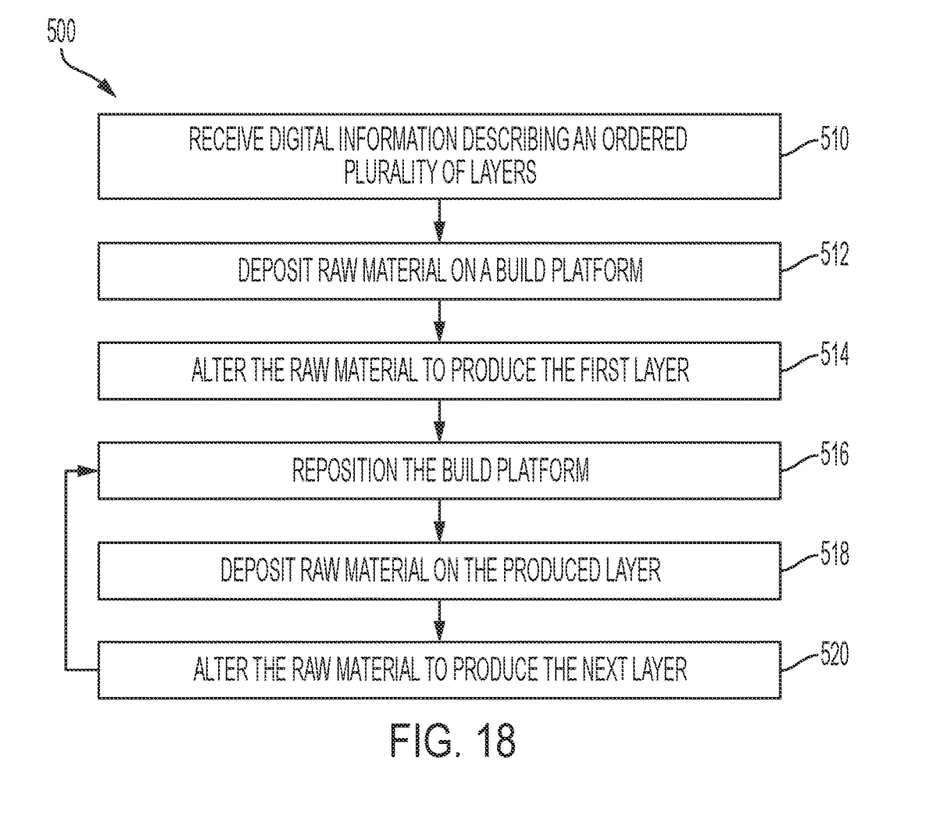
FIG. 18 is a flow chart depicting steps of an illustrative method of additive manufacture.

This section describes steps of an illustrative method for additive manufacture of a workpiece; see FIG. 18. Aspects of an illustrative additive manufacturing device depicted in FIG. 19 may be utilized in the method steps described below. Where appropriate, reference may be made to components and systems that may be used in carrying out each step. These references are for illustration, and are not intended to limit the possible ways of carrying out any particular step of the method.

FIG. 18 is a flowchart illustrating steps performed in an illustrative method, and may not recite the complete process or all steps of the method. Although various steps of method 500 are described below and depicted in FIG. 18, the steps need not necessarily all be performed, and in some cases may be performed simultaneously or in a different order than the order shown.

Figure 19:
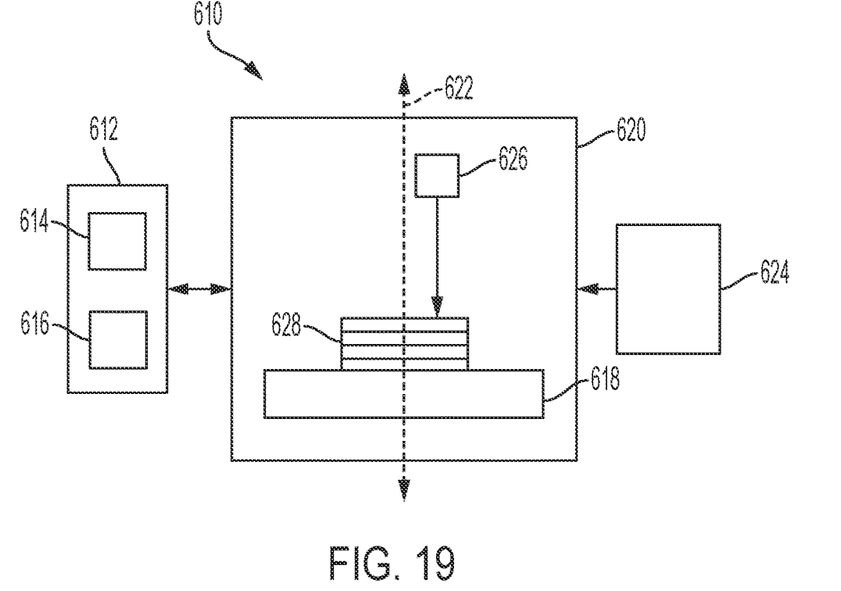
FIG. 19 is a schematic diagram of an illustrative additive manufacturing apparatus.

At step 510, digital information describing an ordered plurality of layers is received. The digital information may be received by a computer controller 612 of an additive manufacturing device 610 as depicted in FIG. 19. The additive manufacturing device may also be referred to as a printer, or a fabricator. Computer controller 612 may comprise any data processing system configured to receive digital design information and control functions of printer 610. The illustrative computer controller shown in FIG. 19 includes a processor 614 for controlling printer functions and memory 616 for storing received data.

The received information may include geometric data and/or design details for a plurality of two-dimensional patterns that constitute layers of a three-dimensional object, where the three-dimensional object is a workpiece 628 to be manufactured, such as a truss panel. The layers may also be described as cross-sections or slices. The plurality of layers is ordered, such that the layers may be numbered or organized from a first layer to a last layer.

Step 512 of method 500 includes depositing raw material on a build platform 618 located in a building environment 620 of printer 610. The build platform may comprise a support moveable by computer controller 612 along a manufacturing axis 622. The build platform may have a planar surface perpendicular to manufacturing axis 622.

The raw material may be any material appropriate to additive manufacturing, typically a fluid or powder and including but not limited to photopolymer resin, thermoplastic, plaster, ceramic, and metal. The material may be distributed from a raw material source 624 such as a hopper, a tank, or a powder bed. For example, aluminum powder may be swept from a powder bed over build platform 618 by a brush arm actuated by computer controller 612.

The raw material may be distributed evenly over build platform 618, or may be deposited in a selected pattern. Depositing may be done under control of computer controller 612. In some examples, build platform 618 may be submerged in raw material and depositing may be accomplished by gravity or fluid pressure. In some examples, a print head 626 connected to raw material source 624 may deposit the raw material in a pattern corresponding to the first layer of the ordered plurality of layers.

At step 514, the raw material is altered to produce the first layer. In other words, a physical change is induced in the deposited material, according to the design information describing the first layer of the ordered plurality of layers and as directed by the computer controller 612, to realize the first layer as a physical object on the build platform.

The material may be acted on by a print head 626 of printer 610, controlled by computer controller 612. For example, the print head may include a laser that cures a photopolymer by exposure to light or sinters a metal powder by exposure to heat. The print head may be directed by computer controller 612 to follow a path delineated in the received digital information for the first layer, and/or a path calculated by processor 614 based on the received digital information.

Step 516 includes repositioning the build platform. In some examples, build platform 618 may start a selected distance from print head 626. The selected distance may be determined by the procedures performed by the print head. Subsequent to production of a layer, the build platform may be repositioned by computer controller 612 along manufacturing axis 622 away from print head 626 by the layer's thickness. That is, the build platform may be moved such that a top surface of the produced layer is the selected distance from print head 626.

In some examples, build platform 618 may start in alignment with another element of printer 610 such as a raw material distribution component. Subsequent to production of a layer, the build platform may be repositioned by computer controller 612 along manufacturing axis 622 such that a top surface of the produced layer is aligned with the other element of printer 610. In some examples, at step 516 print head 626 may be repositioned instead of or in addition to build platform 618. In some examples, step 516 may be skipped.

At step 518, raw material is deposited on the layer produced in the preceding step of method 500. As described for step 512, the raw material may be any appropriate material and may be deposited any appropriate manner. At step 520, the raw material is altered to produce the next layer as previously described for step 514.

Steps 516 through 520 may be repeated to produce each layer of the plurality of layers of the received digital information, until the last layer is produced. The produced first through last layers may then comprise workpiece 628 as described in the received digital information. The workpiece may be removed from the printer and post-processed as desired. For example, the workpiece may be machined from a build plate of the build platform, and then fine details or smooth surfaces may be further finished by machining or other methods.

E. Illustrative Method of Additively Manufacturing a Spacecraft Panel

Figure 20:
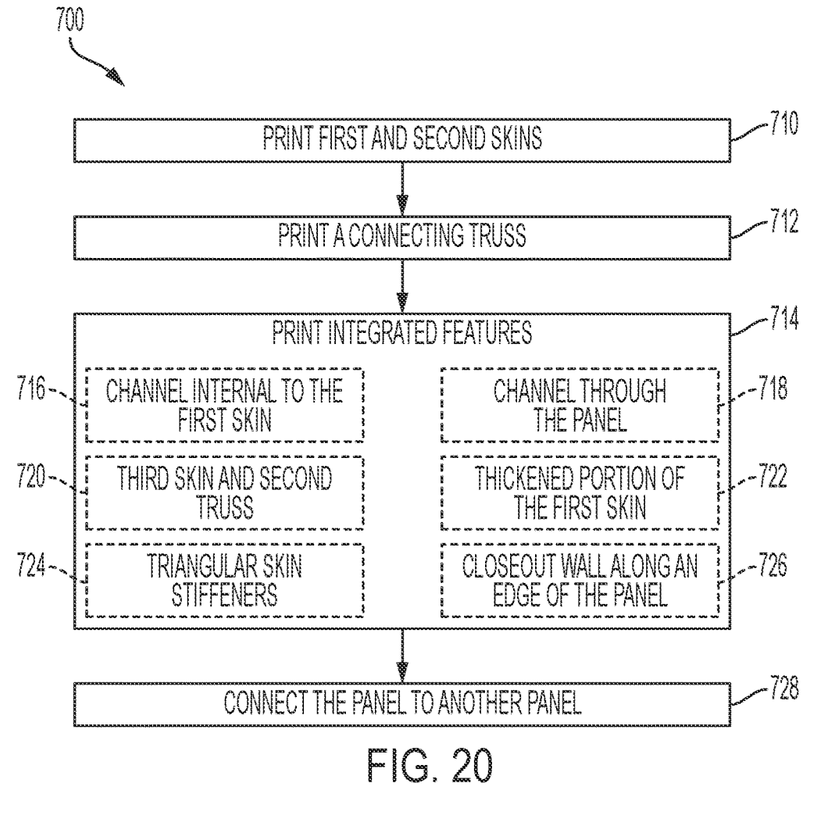
FIG. 20 is a flow chart depicting steps of an illustrative method of additively manufacturing a spacecraft panel, according to the present teachings.

This section describes steps of an illustrative method 700 of additively manufacturing a spacecraft panel; see FIG. 20. Aspects of panels and/or methods described above may be utilized and/or referenced in the method steps described below. Where appropriate, reference may be made to components and systems that may be used in carrying out each step. These references are for illustration, and are not intended to limit the possible ways of carrying out any particular step of the method.

FIG. 20 is a flowchart illustrating steps performed in an illustrative method, and may not recite the complete process or all steps of the method. Although various steps of method 700 are described below and depicted in FIG. 20, the steps need not necessarily all be performed, and in some cases may be performed simultaneously or in a different order than the order shown.

At step 710, the method includes printing a first skin and a second skin. The skins may also be described as face sheets and/or walls. The skins may be printed according to any effective additive manufacturing method, such as method 500 described above. The skins may be printed of any material, including but not limited to laser sintered metal or metal alloy.

The first skin may be spaced from the second skin and may be parallel to the second skin. Each skin may have a generally planar extent and a limited thickness. The thickness of the skins may be equal, may differ, and/or may vary over the skins. The skins may be printed according to a build direction of the additive manufacturing apparatus used. Each skin may have an inner side and an outer side, where each of the inner and outer sides extends parallel the build direction during printing. Step 710 may also be described as vertically printing the skins, and/or the skins may be described as parallel to the build direction during printing.

Step 712 of the method includes printing a connecting truss. The truss may be connected to the first skin and may be connected to the second skin, thereby connecting the first skin to the second skin. The truss may be described as sandwiched between the first and second skins and/or as forming a core of a panel including the first and second skins.

The truss may include a plurality of elongate and/or cross-shaped members arranged into an array of core structures. Each core structure may include a geometrical framework such as a pyramidal framework or a cuboidal framework. The plurality of elongate members may be arranged such that the member function as a structural truss and transfer loads between the first skin and the second skin. Each member may be configured and/or oriented such that the truss can be printed without secondary supports. That is, the truss may be printable without need for subsequent removal of sacrificial supporting structures.

The truss may be printed concurrently with the first and second skins. That is, steps 710 and 712 may be performed simultaneously. Each layer of material deposited during printing may include a portion of the first skin, a portion of the truss, and a portion of the second skin. The first and second skins and the truss may be printed as a single monolithic structure. That is, the skins and the truss may be printed together to form a panel of printed material without joints or seams.

At step 714, the method includes printing integrated features of the panel. Some illustrative optional features are indicated in FIG. 20, but any appropriate structural and/or functional features may be printed as part of step 714. Step 714 and each of sub-steps 716-724 may be performed at least partially concurrently with steps 710 and 712. That is, for some duration of the printing of the first and second skins and the truss structure, integrated features may be simultaneously printed. All printed features may be printed as part of the monolithic structure of the panel. All printed features may be configured for printing without secondary supports.

Optional sub-step 716 includes printing a channel internal to the first skin. The first skin may be printed with an increased thickness to allow integration of the channel. The channel may be described as embedded in second skin and/or as embedded between the first and second skins. The channel may have any appropriate cross-sectional shape and/or path, and may be configured according to the intended function of the channel. For example, the channel may be configured to facilitate heating or cooling of equipment installed adjacent to the panel.

Optional sub-step 718 includes printing a channel through the panel. The channel may extend from an outer side of the first skin through the panel to an outer side of the second skin. The channel may be defined by a tubular wall. For example, the channel may have a circular cross-sectional shape and may be defined by a cylindrical wall. The wall may be disposed between the first and second skins, and may extend through a gap in the truss.

Optional sub-step 720 includes printing a third skin, and a second truss. The second truss may be substantially identical to the truss printed in step 712, or may have any desired geometry and/or include any appropriate core frameworks. The relative alignment of the core frameworks of the two trusses may be selected to provide a desired structural reinforcement or other structural interaction. The third skin may be parallel to but spaced from the second skin. The first, second, and third skins may be matching in shape and thickness. The third skin may be connected to the second skin by the second truss. The second skin may be sandwiched between the second truss and the truss printed in step 712. The first and third skins may form outer surfaces of the truss panel.

Optional sub-step 722 includes printing a thickened portion of the first skin. The thickened portion may be rectangular, circular, shaped to conform a structure adjacent the panel subsequent to assembly of the panel into a structure, and/or any appropriate shape. The increased thickness may extend inward relative to the skin, such that the outer surface of the first skin is unaffected by the thickening. At an outer boundary of the thickened portion, the first skin may include a fillet, chamfer, or other shaping configured to provide a gradual transition between the increased thickness and the remainder of the skin. In some examples, sub-step 722 may include printing multiple thickened portions on the first skin and/or one or more thickened portions on the second skin.

Optional stub-step 724 includes printing triangular skin stiffeners. The skin stiffeners may be printed on an inner side and/or an outer side of the first skin and/or the second skin. The skin stiffeners may comprise an elongate localized thickening of the skin, and may be arranged in any appropriate pattern. For example, the skin stiffeners may form a grid and/or a lattice pattern. The skin stiffeners may be located to coincide with nodes of the truss, in order to facilitate connection of the truss members to the first and/or second skins.

Optional sub-step 726 includes printing a closeout wall along an edge of the panel. The closeout wall may extend between the first skin and the second skin, and may extend perpendicular to both skins. The closeout wall may be configured according to an orientation of the wall relative to a build direction or build axis of the additive manufacturing method used in printing the wall, such that the closeout wall can be printed without secondary supports. For example, a closeout wall extending parallel to the build axis may be substantially planar. For another example, a closeout wall extending perpendicular to the build axis may have a planar face and an angled and/or inverted-V-shaped face. In some examples, sub-step 726 may include printing additional closeout walls along other edges of the panel and/or printing a closeout wall along each edge of the panel.

Step 728 includes connecting the panel to another panel. The panel may be connected along an edge or side region, and may be connected in plane or at an angle relative to another panel. The panel may be connected by any effective means. For example, the panel may be welded and/or bolted to an adjacent panel.

Method 700 may not include post-processing of the panel. That is, the panel may be designed and printed such that smoothing of surface roughness, removal of sacrificial supporting material, and/or machining of additional features is not required.

Illustrative Combinations and Additional Examples

This section describes additional aspects and features of illustrative additively manufactured truss panels, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A method of additively manufacturing a panel, comprising:
  printing a first skin and a second skin spaced from the first skin, and
  printing a first truss structure connecting the first skin to the second skin.

A1 The method of A0, wherein the first skin is parallel to the second skin.

A2. The method of A0 or A1, wherein each of the first skin and the second skin has an outer side and an inner side, each of the inner sides and the outer sides extending in a build direction during the printing steps.

A3. The method of any of A0-A2, wherein the first truss structure includes an array of core structures.

A4. The method of A3, wherein each core structure has a pyramidal framework.

A5. The method of A3 or A4, wherein each core structure has a framework including a plurality of crisscrossed truss members.

A6. The method of any of A3-A5, wherein the density of core structures varies from a first portion of the panel to a second portion of the panel.

A7. The method of any of A0-A6, further comprising:
  printing a channel between the first skin and the second skin.

A8. The method of A7, wherein the step of printing a channel includes printing one or more walls between the first and second skins to form an internal channel embedded between the first and second skins.

A9. The method of A7 or A8, wherein the step of printing a channel includes printing one or more walls to form a channel through the first and second skins from one side of the panel to an opposite side of the panel.

A10. The method of any of A0-A9, further comprising:
  printing a third skin, and
  printing a second truss structure connecting the second skin to the third skin.

A11. The method of any of A0-A10, wherein the step of printing the first skin includes printing a thickened portion of the first skin.

A12. The method of any of A0-A11, further comprising:
  printing a closeout wall between the first skin and the second skin along an edge portion of the panel.

A13. The method of any of A0-A12, further comprising connecting an end portion of the panel to an end portion of another additively manufactured panel.

A14. The method of any of A0-A13, wherein the printing steps include depositing multiple layers of laser sintered metal.

A15. The method of any of A0-A14, wherein the first skin, the second skin, and the first truss structure are printed concurrently.

A16. The method of any of A0-A15, further comprising:
  printing a locally thickened portion of the first skin A17. The method of A16, wherein the thickened portion is configured to act as a thermal or structural doubler.

A18. The method of any of A0-A17, wherein the first truss structure includes an array of core structures, further comprising:
  selecting a first desired stiffness for a first region of the panel and a second desired stiffness for a second region of the panel; and
  printing a first density of core structures in the first region of the panel and a second density of core structures in the second region of the panel, wherein the first density corresponds to the first desired stiffness and the second density corresponds to the second desired stiffness.

A19. The method of any of A0-A18, further comprising:
  printing a third skin spaced from the second skin, and
  printing a second truss structure connecting the second skin to the third skin.

A20. The method of any of A0-A19, wherein the first truss structure includes an array of X-shaped truss members connected through nodes on inner sides of the first and second skins.

A21. The method of any of A0-A20, wherein the first truss structure includes an array of core structures, each core structure having a square pyramid shape.

B0. A panel comprising:
  a first skin,
  a second skin spaced apart from the first skin,
  a first truss structure connecting the first skin to the second skin, wherein the first skin, second skin, and first truss structure form a single additively manufactured unit.

B1. The panel of B0, wherein the first skin is parallel to the second skin.

B2. The panel of B0 or B1, wherein the first truss structure includes an array of core structures.

B3. The panel of B2, wherein each core structure has a pyramidal framework.

B4. The panel of B2 or B3, wherein each core structure has a framework including a plurality of crisscrossed truss members.

B5. The panel of any of B2-B4, wherein the density of core structures varies from a first portion of the panel to a second portion of the panel.

B6. The panel of any of B0-B5, further comprising:
  one or more walls between the first skin and the second skin forming an internal passage embedded between the first and second skins.

B7. The panel of any of B0-B6, further comprising:
one or more walls between the first skin and the second skin forming a passage through the first and second skins from one side of the panel to an opposite side of the panel.

B8. The panel of any of B0-B7, further comprising:
a third skin, and
a second truss structure connecting the second skin to the third skin.

B9. The panel of any of B0-B8, wherein the first skin includes an additively manufactured thickened portion.

B10. The panel of any of B0-B9, further comprising:
an additively manufactured closeout wall between the first skin and the second skin along an edge portion of the panel.

B11. The panel of any of B0-B10, wherein first skin, second skin, and truss structure are comprised of laser sintered metal.

B12. The panel of any of B0-B11, further comprising localized shielding configured for one of (a) impact shielding or (b) radiation shielding.

C0. A panel manufacturing system, comprising:
an additive manufacturing apparatus including a build plate for supporting a three-dimensional structure during a sequence of printing steps,
a printed first skin and a printed second skin spaced apart from the first skin, each skin having an edge portion connected to the build plate and an external surface in a plane perpendicular to the build plate, and
a printed truss structure connecting the first skin to the second skin.

D0. A spacecraft, comprising:
a body including a plurality of additively manufactured panels;
wherein each additively manufactured panel includes:
a first skin;
a second skin spaced apart from the first skin;
a truss structure connecting the first skin to the second skin, wherein the first skin, the second skin, and the truss structure form a single additively manufactured unit.

Advantages, Features, and Benefits

The different examples of the additively manufactured truss panels described herein provide several advantages over known solutions for manufacturing spacecraft panels. For example, illustrative examples described herein allow rapid, on-demand production of panels.

Additionally, and among other benefits, illustrative examples described herein reduce manufacturing cycle time, including reducing the number of manufacturing steps, the touch labor time, and the post-production testing.

Additionally, and among other benefits, illustrative examples described herein improve thermal performance and heat rejection, for instance by removing impedance between face sheets and core structures from adhesive materials.

Additionally, and among other benefits, illustrative examples described herein allow structural features such as mounting points, stiffeners, and/or heat pipes to be integrated and manufactured as part of a panel.

Additionally, and among other benefits, illustrative examples described herein allow high levels of customization and localized design, including features such as localized reinforcement or radiation spot shielding, access points, stiffness tuning, tailoring for thermal spreading and heat dissipation, and thickening at weld joins to accommodate strength loss in heat affected zones.

No known system or device can perform these functions, particularly for high-strength and light-weight metallic alloy panels. Thus, the illustrative examples described herein are particularly useful for spacecraft structural panels. However, not all examples described herein provide the same advantages or the same degree of advantage.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of manufacturing a spacecraft panel, comprising:
printing a first skin with a first outer surface, a first inner surface, and a first thickness;
printing a first grid of stiffeners along the first inner surface comprising one or more first grid units;
printing a second skin with a second outer surface, a second inner surface, and a second thickness, the second skin being spaced apart from the first skin with the second inner surface facing the first inner surface;
printing a second grid of stiffeners along the second inner surface comprising one or more second grid units; and
printing a plurality of cross-shaped truss members of a first truss structure connecting the first skin to the second skin,
wherein:
each cross-shaped truss member consists of:
two first legs that extend from first nodes on the first inner surface of the first skin and converge to a central join region situated between the first skin and the second skin; and
two second legs that diverge and extend from the central join region to second nodes on the second inner surface of the second skin;
the first nodes are defined at first intersections of the first grid of stiffeners;
the second nodes are defined at second intersections of the second grid of stiffeners;
the first grid units are offset from the second grid units such that when viewed along a direction normal to the first skin, each one of the first nodes is aligned with a geometric center of one of the second grid units; and
each cross-shaped truss member is integral to and spans a gap between the first skin and the second skin and the first skin, the second skin, and the first truss structure collectively form a single monolithic joint-free structure.

2. The method of claim 1, wherein:
printing the first skin and printing the first grid of stiffeners are performed concurrently;
printing the first skin and printing the second grid of stiffeners with the second skin are performed concurrently;
the one or more first grid units of the first grid of stiffeners comprises one or more first grid squares;
the one of more second grid units of the second grid of stiffeners comprises one or more second grid squares; and
printing the plurality of cross-shaped truss members comprises printing each cross-shaped truss member to extend between associated ones of the first nodes and the second nodes.

3. The method of claim 1, wherein
the second grid units are offset from the first grid units such that when viewed along a direction normal to the second skin, each one of the second nodes is aligned with a geometric center of one of the first grid units.

4. The method of claim 1, further comprising:
printing a closeout wall during the printing of the first skin, the second skin, and the plurality of cross-shaped truss members.

5. The method of claim 1, wherein printing the plurality of cross-shaped truss members comprises:
printing the plurality of cross-shaped truss members as an array of core structures that vary in a base span dimension between the core structures over at least one region of the spacecraft panel.

6. The method of claim 1, further comprising:
printing a third skin spaced apart from the second skin, and a second truss structure connecting the second skin to the third skin, during the printing of the first skin, the second skin, and the plurality of cross-shaped truss members; and
wherein the third skin along with the first skin, the second skin, and the plurality of cross-shaped truss members together define a plurality of layers where multiple layers of the plurality of layers in the single monolithic joint-free structure include a portion of the first skin, the portion of the first truss structure, the portion of the second skin, a portion of the second truss structure and a portion of third skin.

7. The method of claim 1, wherein the spacecraft panel has a primary axis parallel to a lengthwise direction of the first skin and the second skin, and a secondary axis perpendicular to the primary axis and normal to the first skin and the second skin, the step of printing the plurality of cross-shaped truss members comprising:
printing each cross-shaped truss member at a first truss angle of 35-50 degrees relative to the secondary axis when the spacecraft panel is viewed along a direction perpendicular to both the primary axis and the secondary axis, and at a second truss angle of 35-50 degrees relative to the secondary axis when the spacecraft panel is viewed along the primary axis.

8. The method of claim 1, wherein printing the first skin and the second skin comprises:
printing at least one of the first skin and the second skin with an internal channel embedded in the first skin and/or the second skin.

9. The method of claim 1, wherein printing the first skin, the second skin, and the plurality of cross-shaped truss members comprises:
printing, using an additive manufacturing apparatus, the spacecraft panel in a manner such that a lengthwise direction of the first skin and the second skin is parallel to a build direction of the additive manufacturing apparatus.

10. The method of claim 1, wherein the first thickness of the first skin is a first uniform thickness, and the second thickness of the second skin is a second uniform thickness.

11. The method of claim 1, further comprising:
printing a plurality of circular bosses extending perpendicularly from at least one of the first inner surface of the first skin and the second inner surface of the second skin to facilitate and strengthen connection between select cross-shaped truss members and at least one of the first skin and the second skin.

12. The method of claim 1, wherein printing the first grid of stiffeners and printing the second grid of stiffeners comprise printing triangular skin stiffeners.

13. The method of claim 1, wherein:
the first skin, the second skin, and the first truss structure together define a plurality of layers of material; and
multiple layers of the plurality of layers in the single monolithic joint-free structure include a portion of the first skin, a portion of the first truss structure, and a portion of the second skin.

14. The method of claim 1, further comprising connecting the spacecraft panel to another panel.

15. The method of claim 4, wherein the closeout wall extends between the first skin and the second skin along at least one edge of the spacecraft panel.

16. The method of claim 15, wherein a group of layers along the at least one edge of the spacecraft panel includes a portion of the first skin, a portion of the closeout wall, and the portion of the second skin.

17. The method of claim 13, further comprising receiving digital information describing an ordered plurality of the layers by an additive manufacturing device.

18. The method of claim 17, wherein printing the first skin, the second skin, and the plurality of cross-shaped truss members comprises depositing raw material on a build platform of the additive manufacturing device.

19. The method of claim 18, wherein printing the first skin, the second skin, and the plurality of cross-shaped truss members further comprises altering the raw material to form each one of the plurality of layers.

20. The method of claim 19, further comprising repositioning the build platform after forming each one of the plurality of layers,
wherein printing the first skin, the second skin, and the first plurality of cross-shaped truss members further comprises:
depositing the raw material on each previous one of the plurality of layers; and
altering the raw material to form each subsequent one of the plurality of layers.

* * * * *